United States Patent

Schoettle

[11] Patent Number: 4,786,007
[45] Date of Patent: Nov. 22, 1988

[54] CLAMP FOR FLEXIBLE STRIP MATERIAL AND A HUB THEREFOR

[75] Inventor: Klaus Schoettle, Heidelberg, Fed. Rep. of Germany

[73] Assignee: BASF Aktiengesellschaft, Ludwigshafen, Fed. Rep. of Germany

[21] Appl. No.: 22,746

[22] Filed: Mar. 6, 1987

[30] Foreign Application Priority Data

Mar. 8, 1986 [DE] Fed. Rep. of Germany ....... 8606398

[51] Int. Cl.$^4$ .................. B65H 75/28; G11B 15/60
[52] U.S. Cl. ..................................................... 242/74
[58] Field of Search .............. 242/74, 74.1, 74.2, 242/125.1

[56] References Cited

U.S. PATENT DOCUMENTS

| 3,387,800 | 6/1968 | Hoag | 242/74.2 |
| 3,495,787 | 2/1970 | Wallace. | |
| 3,661,345 | 5/1972 | Ritz et al. | |
| 3,785,482 | 1/1974 | Preston | 242/74 X |
| 3,944,155 | 3/1976 | Wilczewski. | |
| 3,960,338 | 6/1976 | Shapley | 242/74.1 |
| 4,226,382 | 10/1980 | Watanabe | 242/74 |
| 4,290,562 | 9/1981 | Sasaki | 242/74 |
| 4,330,096 | 5/1982 | Bartel | 242/74.1 |
| 4,357,642 | 11/1982 | Bolick. | |
| 4,456,192 | 6/1984 | Sato | 242/74.1 |

FOREIGN PATENT DOCUMENTS 1928049 5/1965 Fed. Rep. of Germany.

Primary Examiner—Stuart S. Levy
Assistant Examiner—Katherine Matecki
Attorney, Agent, or Firm—Keil & Weinkauf

[57] ABSTRACT

A clamp for flexible strip material, e.g. for a tape reel, is designed to be completely separable from a hub and consists of parts (11, 12) which can be connected to one another and to the tape of strip element outside the hub and can be inserted into the hub.

The clamp is suitable in principle for any type of reel for tape-like or strip-like material, in particular for magnetic recording media.

3 Claims, 2 Drawing Sheets

CLAMP FOR FLEXIBLE STRIP MATERIAL AND A HUB THEREFOR

BACKGROUND OF THE INVENTION AND PRIOR ART

This invention relates to a clamp for flexible strip material, in particular tape-like material. The invention also relates to a hub and a reel provided with such a clamp and to a method for clamping tape-like material on said hub. In particular the invention also relates to a tape cassette fitted with a clamp.

Tape clamps for tape-like or strip-like material, for example magnetic recording media, are conventionally employed in tape reels. In particular tape is would in rolls onto hubs which are either flangeless or provided with one or more flanges, i.e. reel hubs or winding hubs. One or both ends of the tape is fastened to one or both of the hubs.

For magnetic tape reels, omega-shaped tape clamps are known from, for example, German Utility Model No. 1,928,049. Such a known tape clamp is provided with hooked legs for releasably locking the clamp in an associated recess in the periphery of the hub so that the tape is firmly clamped between the recess contour of the winding hub and the tape clamp. An arcuate part of the omega-shaped clamp is intended to close the peripheral recess in an essentially stepless and continous manner.

Other tape clamps which have been disclosed for tape winding hubs, for example in U.S. Pat. Nos. 3,661,345, 3,495,787 and 4,357,642 and German Laid-Open Application DOS No. 2,455,182, are integrally hingedly connected at one end to the hub and can be hinged about this connection into and out of a recess in the hub periphery to enable the tape to be fixed to, and released from, the hub.

OBJECTS AND SUMMARY OF THE INVENTION

Because of substantial manufacturing tolerances in the known tape clamps, possibly together with fluctuations in the thickness of the leader of the magnetic tape, impressions on the tape and other tape damage may occur.

It is an aim of the present invention to improve known clamps for flexible strip material, e.g. tape, the improvements including a simplified clamping process and preferably the provision of a better hub.

According to one aspect of the invention there is provided a clamp for clamping a flexible strip material, in particular a tape, on a hub, comprising first and second parts provided with interengageable locking means for releasably locking the first and second parts in a clamping position for securing said flexible strip material therebetween, and clamp-locking elements for releasably securing the clamp in a recess of said hub around which said flexible strip material is intended to be wound.

This and the other advantageous embodiments of the clamp have the following advantages, in particular when clamping flexible recording medium having a fastening end or leader:

(1) Impressions on the recording medium, in particular as a result of projecting tape ends or at the emerging tape fastening end/leader, are avoided.

(2) Good retaining power is achieved, if required, by wedging the tape fastening end/leader.

(3) The danger of tearing or shearing of the tape fastening end/leader during the clamping process is minimized.

(4) Damaged tape clamps can be replaced simply.

In practice, the clamp consists of two parts, first and second parts, which are connected, e.g. integrally, to one another at one end and whose other free ends have tape-locking elements.

In an advantageous embodiment, the first part comprises an arcuate portion having a leg at one end thereof and in which the second part is connected to said first part adjacent said one end, the other ends of the first and second parts remote from the said one end being provided with said interengageable locking means.

Advantageously the interengageable locking means are interengageable in a snapfit connection.

Furthermore said locking means comprise a projection on one of said first and second parts and a cooperating recess for receiving said projection in the other of said first and second parts.

Practically the said leg ("locking leg") and the said other end of the second part provide said clamp-locking elements.

In a more detailed embodiment, said first part comprises a middle arcuate portion and, at opposite ends thereof, a pair of legs (locking leg and connecting leg) providing said clamp-locking elements, and in which the second part is connected to the first part at least adjacent one of said legs, the other leg and the free end of the second part remote from said one leg being provided with said interengageable locking means.

In practice, for producing a smooth peripheral transition of the strip or tape without s step the lengths of the said legs are the same and correspond accurately to the depth of the recess in the hub.

In practice, said locking means comprises a recess in said other leg ("locking leg") and a free end portion of said second part interengageable therein.

Furthermore, said first part of the clamp is integrally, e.g. resiliently, connected to said second part.

In practice, said first and second parts of the clamp, when interengaged, define a cavity therebetween for said flexible strip material.

In a further configuration, said clamp-locking elements are in the form of outwardly extending hook extensions for engagement in recessed portions of said hub recess.

A further aspect of the present invention relates to the appropriate hub embodiment described below.

Said hub for receiving a roll of flexible strip material, in particular tape, would therearound, comprises a substantially cylindrical surface having a least one recess formed therein and a clamp detachably retained in at least one recess, the clamp-locking elements interengaging with recess means when the clamp is retained in the recess, the clamp when detached from the hub recess being completely separate from the rest of the hub.

In such a hub embodiment, the clamp has an arcuate outer surface of substantially the same curvature as the said cylindrical surface, the depth of the at least one recess and the dimension of the clamp being such that when an end of said flexible strip material is fixed to the clamp and the clamp is retained in the hub recess, one end of the arcuate outer surface of the clamp projects outwardly of the said cylindrical surface of the hub by a predetermined distance corresponding to the thickness of the clamped strip material.

Further embodiments of the invention comprise the reel of flexible strip material or tape-like material, in particular magnetic tape.

Another aspect of the invention relates to a tape cassette containing at least one such specific reel according to the present invention.

This invention is also directed to a method of clamping a strip or tapelike material by the novel clamp to the appropriate hub as described below.

This method of clamping a flexible strip material, in particular a tape-like recording medium, on a hub provided with at least one recess for receiving a tape clamp, said at least one recess having locking elements interengageable with cooperating locking elements on the tape clamp for releasably locking the tape clamp within the at least on recess, comprising fixing the tape-like recording medium at at least one end by means of tape-locking elements of the tape clamp and then inserting the tape clamp with the recording medium fixed thereto into the at least one hub recess, the locking elements of the tape clamp interengaging with the locking elements of the hub recess to retain the tape clamp in the recess.

A further advantageous aspect of the method according to the invention is obtained if each end of the recording medium is provided with a tape clamp and each tape clamp is detachably inserted into one recess in each of two hubs.

A clamp in conjunction with a hub and a fastening tape is also particularly advantageous when the length of the legs of the clamp is essentially the same as the depth of the recess in the hub, so that, when the tape fastening end is fixed by the clamp and the clamp is detachably retained in position in the recess, an outer edge of the clamp projects beyond the arc contour of the hub by a thickness of the fastening tape.

Thus, simplifications are also achieved in particular in the process of clamping a tape-like or strip-like recording medium to a flanged or flangeless hub, the peripheral edge of the hub having one or more recesses with hook elements for fixing a tape clamp therein, if the recording medium is fixed at one or both ends by means of tape-locking elements of one or more tape clamps outside the tape reel and then inserted in a detachable manner in the recess(es) of the hub(s), hook extensions of the tape clamp(s) being engaged with hook elements of the recess(es). Advantageously, both ends of the recording medium can be provided with tape clamps and detachably inserted into one recess in each of two hubs. To produce a tape cassette, the recording medium provided with the hubs can be inserted into the cassette housing.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENTS

Figure 1:
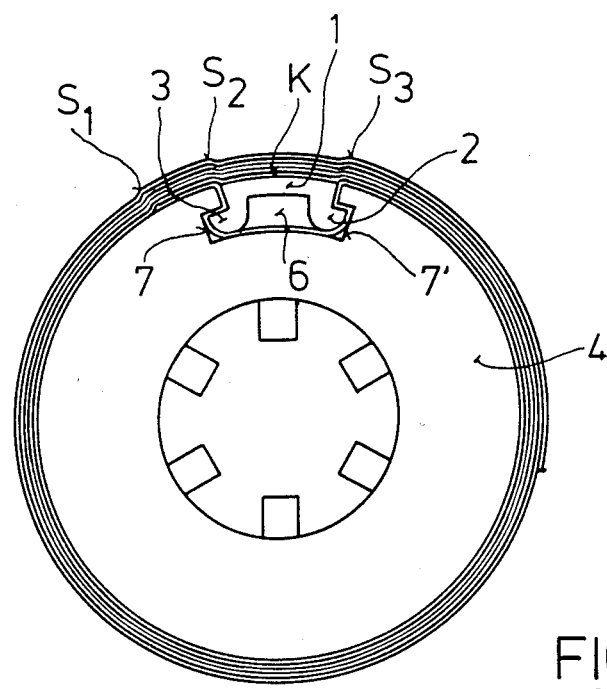
FIG. 1 is a view of a known magnetic tape cassette hub.

In the case of magnetic tape cassette reels, magnetic tape 5 is wound round a hub 4, one end of the magnetic tape being fastened to the hub 4. Desirably this fastening should be secure and should not impair the functioning of the tape cassette. A large number of different prior art clamps are known for this purpose. As shown in FIG. 1, these prior art clamps are frequently omega-shaped and are detachably retained in a hub recess 6 with the aid of two hook ends 2, 3 which hook into corresponding grooves 7, 7' of the recess 6. In general, the hook ends 2, 3 together with an arcuate middle part 1 of the clamp K which closes the peripheral recess 6 of the hub 4 is designed so that its circumferential dimension together with the tape layer is somewhat larger than the recess 6, so that the clamp K is jammed in recess 6 with a certain amount of deformation to securely hold the magnetic tape 5 in position. Such hubs 4 and clamps K are manufactured from plastic in large numbers and are generally assembled on automatic machines. In this respect, the conventional tape clamp embodiment K has a number of disadvantages. On the one hand, where production volumes are large, the hubs and clamps originate from a plurality of injection molds, which results in a wide tolerance range. Hence, parts which are not a good match in terms of tolerances inevitably come together in the automatic assembly machines, and this problem is accentuated by the fact that the thickness of the magnetic tape and of the leader can vary. For example, if the clamp is too small in relation to the hub recess, the tape cannot be fastened securely and can easily be pulled out from the hub. However, the converse case of an excessively large clamp is also unfavorable since the middle part of the clamp K then arches and distorts the cylindrical shape of the peripheral surface of the hub and has an adverse effect on the rotation of the reel.

Problems with rotation and additional impressions on the magnetic tape extending radially outwards far into the wound roll of tape are also encountered in conventional clamps K where the clamped tape end produces a step, corresponding to the thickness of the tape, at the points of entry into and emergence from (S2 and S3 respectively) the hub recess and at the free end S1 of the tape. Moreover, because of the tolerances, the tape is frequently clamped in a slightly skew position, which in turn may lead to a step in the roll periphery or cause the outer wound layers to run against the cassette housing until the roll jams.

Figure 2:
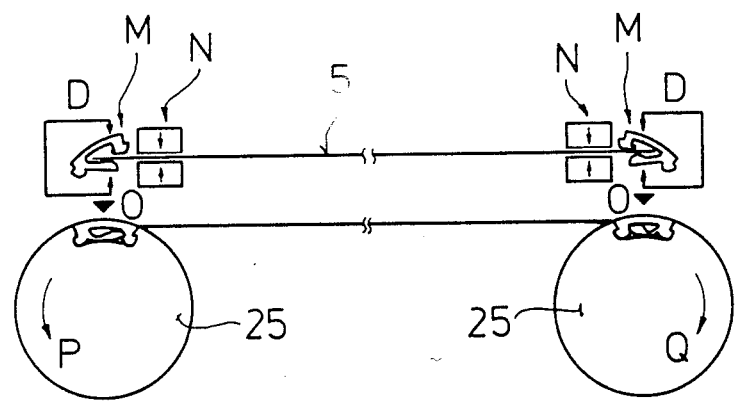
FIG. 2 illustrates schematically a method according to the invention of clamping tape to hubs of a tape cassette.
Figure 3:
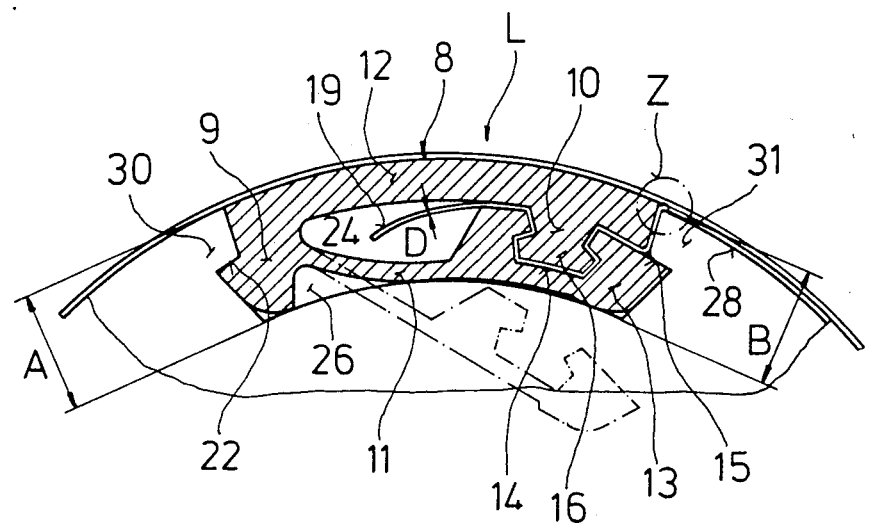
FIG. 3 shows a first embodiment of a clamp according to the invention.
Figure 4:
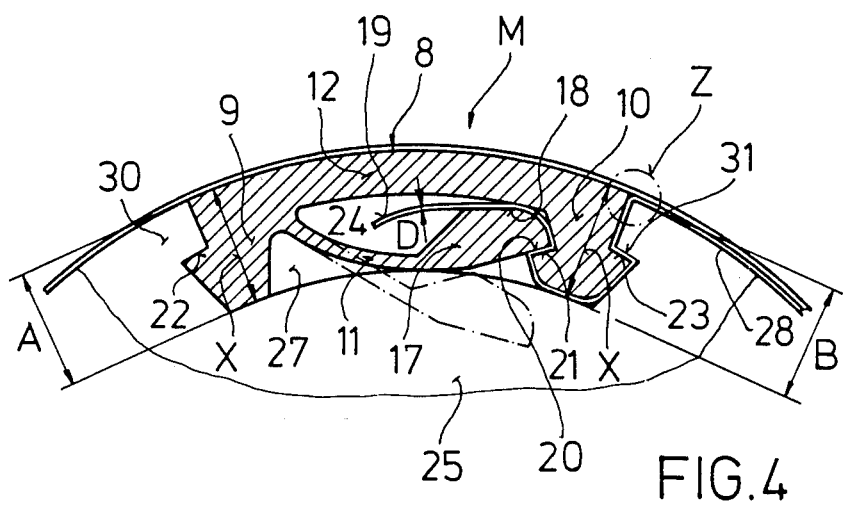
FIG. 4 shows a second embodiment of a tape clamp according to the invention.
Figure 5:
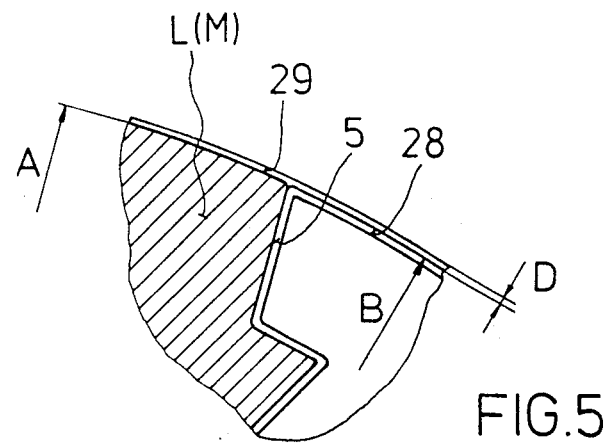
FIG. 5 shows a detail Z from FIGS. 3 and 4.

Novel tape clamps according to the invention are shown in FIGS. 3 to 5, and a tape clamping process is shown in FIG. 2.

Tape clamps L and M (shown, respectively, in FIGS. 3 and 4) essentially consist of a U-shaped or channel-shaped part 8, having an arcuate part 12 and leg parts 9 and 10, and an arm 11 which is flexibly connected, preferably by means of a resilient connection, to one leg part, for example part 9. The tape clamp is advantageously produced as a single, integral piece. Interengaging tape-locking elements are provided at the free end of the arm 11 and the part 8. In both cases, the tape-locking elements engage the locking leg, for example leg 10, when it is intended to fix the tape fastening end or leader.

The clamp L possesses a front tape-locking element 13 which has a pushbutton depression 14 and an outward-projecting locking lug 15 (also referred to as hook extension). A pushbutton extension 16 on locking leg 10 fits into the pushbutton depression 14. In the case of tape clamp M, the arm part 11 possesses an enlarged head 17 having a rounded part 18, for fixing the tape end 19, and a locking edge 20, the latter for locking behind the locking projection 21 on the locking leg 10. Legs 9 and 10 also have the outer hook extensions 22 and 23, corresponding to the hook ends 2 and 3 in FIG. 1.

In FIG. 3, although connecting leg 9 has the corresponding outer hook extension 22, the other outer extension is the locking lug 15, which rests under the hook elements 30 and 31 only after the clamp L has been brought into its closing and locking position. In each embodiment, a cavity 24 is advantageously present between U-shaped or channel-shaped part 8 and arm part 11, for receiving the entire tape fastening end or leader 19.

The U-shaped or channel-shaped part 8 of each clamp L or M is the basic element of the clamp, in which the arm part 11 locks under pressure exerted by apparatus D in FIG. 2, so that the previously inserted tape end 19 is firmly connected to the clamp L, M before the clamp is attached to the hub 25. Thereafter, the clamp L, M is inserted in the direction 0, by means of pressure, into the appropriate recess 26 or 27 of hub 25.

The following should be noted in connection with the dimensions of the novel clamp embodiments L and M. The height X of the legs 9 and 10 of the U-shaped or channel-shaped part 8 is chosen to be exactly the same as the depth of the recess 26 or 27, measure from the peripheral edge of the hub 25. The tape 5 anchored in the tape clamp L or M rests between the locking elements 14 and 16 (FIG. 3) or between the leg 10 and the bottom of the recess 27. The tape 5 is therefore in contact with the clamp only at one end and raises the clamp partially or completely out of the recess 26 or 27, by the thickness of the tape. The height of the raised portion of the outer clamp contour depends directly on the thickness of the clamped fastening tape or leader tape. The outer surface of the tape section 28 emerging from the hub recess 26 or 27 is therefore exactly at the level of the peripheral surface of the tape clamp L or M. Thus, $$B = A + D,$$

where
A is the height of the clamp L or M in the recess,
B is the height of the outer surface of the emerging tape section 28 above the bottom of the recess, and
D is the thickness of the end of the fastening tape or of the leader.

The subsequent tape layer 29 encounters a stepless, smooth lateral surface, so that impressions on this and all subsequent tape layers due to the tape clamp only occur, if at all, to a very reduced extent. For complete elimination, of course, exact dimensions of recess and tape clamp in the direction of the periphery are also essential.

For the above, extreme precision requirements in the case of very thin magnetic tapes of less than 10 $\mu$m, it is necessary for the hub and its recess to be manufactured by series production but nevertheless with an exact fit. The tape clamp embodiments according to the invention therefore have a three-dimensional shape which allows easy checking of the fitting dimensions, such as height X of the tape clamp legs 9 and 10 and depths and steps of the recess, by means of a slide gauge or a micrometer screw.

FIG. 2 shows schematically the assembly process for the novel tape clamps, using tape clamps M as an example.

Clamps M are each fed in the open position by means of apparatuses which are not shown. The end of the tape 5 to be fastened is then inserted into the open clamp M by a tape feed apparatus N. By means of a compression apparatus, illustrated schematically by arrows D, the clamp M is closed at each tape end and then inserted, in the direction of the arrow O, into the predetermined recess of the hub 25 by means of an appropriate apparatus, once again under pressure.

The tape length is then wound onto the hubs 25 in directions P and Q by means of suitable winding apparatuses, after which the tape and hubs are inserted into open cassette housings. All operations can be carried out completely automatically.

I claim:

1. A clamp for clamping a flexible strip material, in particular a tape, on a hub having a recess, in such a way that the clamp itself provides the anchor point for winding the flexible strip material on the hub, said clamp comprising
a generally U-shaped part having legs extending substantially in a direction concentric with the periphery of said hub, the legs of said part being provided with interengageable locking means in the form of a protrusion at the free end portion of one of said legs and a cooperating indentation at the free end portion of the other of said legs so as to releasably lock said legs together in a clamping position, with said strip material clamped therebetween in a generally wavelike configuration to prevent said material from being pulled out from between said legs; and also comprising
two end portions which are spaced from each other along the periphery of the hub, and a clamp locking element formed at each end portion for releasably securing the clamp in said recess so as to provide said anchor point.

2. A clamp according to claim 1, in which at the bite end of the U the other of said legs is resiliently connected to said one leg.

3. A clamp according to claim 1, in which said clamp-locking elements are in the form of outwardly extending hook extensions for engagement in undercuts of the recess of said hub.

* * * * *